3,191,575
ENGINE PRESERVATION METHOD AND APPARATUS
Robert W. Martin, Cleveland, and Robert H. Jamrog, Strongsville, Ohio, assignors to General Motors Corporation, Detroit, Mich., a corporation of Delaware
Filed Jan. 27, 1960, Ser. No. 5,005
3 Claims. (Cl. 118—317)

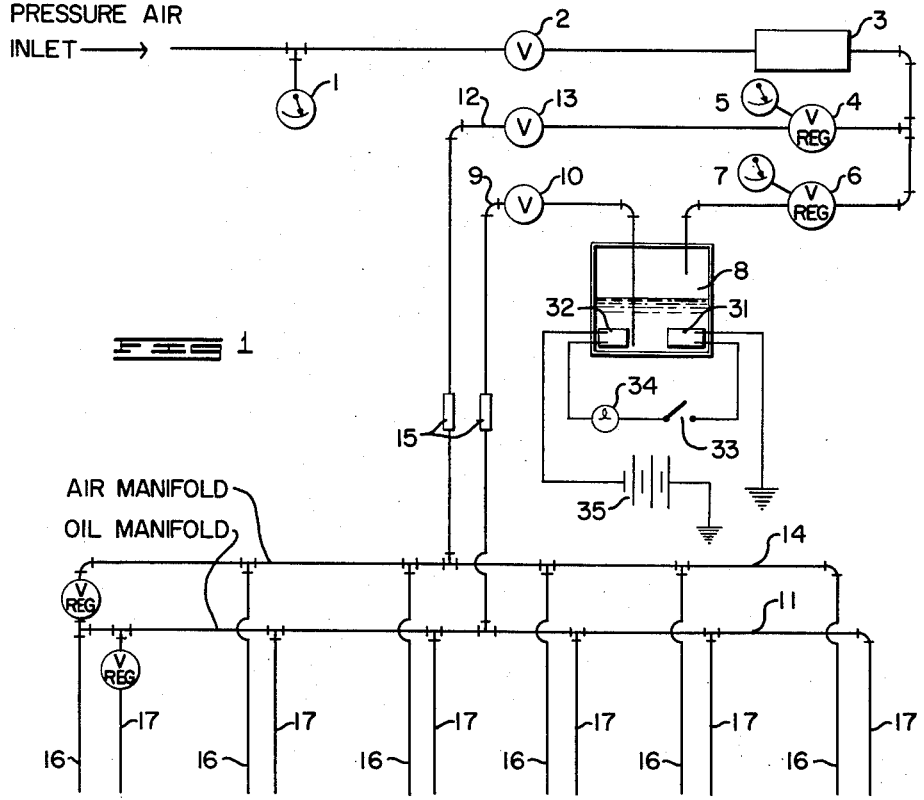
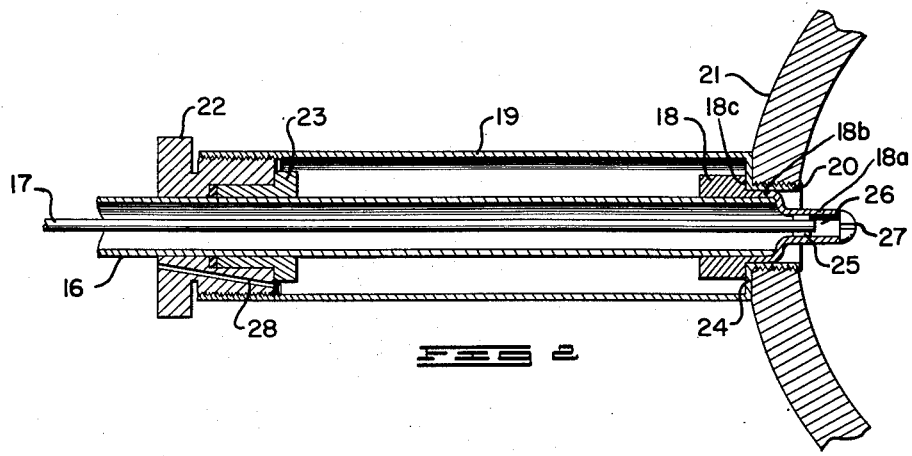
INVENTOR
ROBERT W. MARTIN
ROBERT H. JAMROG
BY F. J. Soucek
ATTORNEY

United States Patent Office 3,191,575
Patented June 29, 1965

This invention relates to an engine preservation method and an apparatus for performing the same and, more particularly, to a method and apparatus for diffusing a preservative fluid in an internal combustion engine.

In the past, it has been attempted to preserve engine parts by either inducing a preservative fluid in the intake manifold of an engine while running the engine, or by placing a certain quantity of preservative in the cylinder through the spark plug aperture and subsequently running the engine to spread out the preservative over the engine parts. The former of these two methods is found unsatisfactory in that if the engine is still running certain areas to be preserved are hot and, therefore, burn off the preservative and preclude any protection. Also, where the preservative is atomized and added to the intake manifold, there is a subsequent agglomeration of the atomized particles causing an increase in particle weight resulting in a reduction of spreadability to all of the engine parts. In the second aforementioned method of preservation, the fluid added to the cylinder will not spread-out over the intake and exhaust valves and stems or the intake and exhaust manifold.

The purpose of this invention is to overcome the disadvantages of the preservative methods now in wide use and to provide a more complete method for preserving all of the working parts of the engine connected with the cylinder, including the intake and exhaust manifolds and the valves and valve stems.

A second purpose of this invention is to provide an apparatus for accomplishing this new type preservation method and for adding atomized preservative fluid into the cylinder. Another purpose is to provide apparatus that will properly combine air and preservative to atomize the preservative and to provide greater flowability of the atomized preservative throughout the working parts of the engine. Other advantages and objectives will be found upon perusal of the following specification and figures wherein:

FIGURE 1 discloses a schematic for the apparatus carrying out the features of this invention;
FIGURE 2 is a sectional view of the preservative nozzle assembly; and
FIGURE 3 is an end view of the nozzle end positioned within the internal combustion engine cylinder.

Referring now to the figures, there is shown in FIGURE 1 a conduit system with an air pressure inlet, a gauge 1 and a valve 2 for measuring and controlling the air pressure inlet, respectively, and an air cleaner 3 for eliminating any foreign particles found within the inlet air. This air pressure is directed to an air pressure regulator 4 with an associated gauge 5 and to a second regulator 6 with its associated gauge 7. Air fluid from the regulator 6 is directed to an oil reservoir 8 to pressurize the oil within that reservoir. A conduit 9 and a solenoid operated valve 10 direct the oil from the reservoir to an oil manifold 11. Similarly, a conduit 12 and solenoid operated valve 13 direct the pressurized air to an air manifold 14. Quick disconnections 15 may be provided in the conduits 9 and 12 in order to separate the oil and air manifolds from the other part of the apparatus. This will allow for greater flexibility for cleaning and for storage of the parts. In addition, the conduits 9 and 12 may be of the flexible type and may be of sufficient length so that the apparatus including reservoir and regulators may be placed at a distance from the oil and air manifolds and from the actual engine to be preserved.

A plurality of air conduits 16 and a plurality of oil conduits 17 are connected to the air and oil manifolds, respectively. In each of these conduits there is a regulator valve for manually regulating and proportioning the air and oil flow in each pair of conduits 16 and 17. (FIGURE 1, however, shows regulators in only the conduits 16 and 17 located at the leftmost end of the manifold, but it should be realized that regulators are placed in each of the conduits 16 and 17.) In each pair of oil and air conduits the oil conduit is preferably placed concentrically within the air conduit in a conventional manner. This placing of the conduits in a concentric relationship reduces the number of conduits from the manifold section to the engine and provides a more compact nozzle assembly adjacent the engine. Since in many installations it is very difficult to reach the spark plugs it is of special advantage to have a compact nozzle assembly to thereby increase the adaptability of the nozzle to the particular engine installation and its related accessories.

In FIGURE 2, there is shown the oil conduit 17 and air conduit 16 in concentric relationship and associated with a nozzle 18 and an adaptor tube 19. The adaptor tube 19 has a reduced portion 20 with external threads that are adapted to screw within the conventional spark plug aperture within a cylinder head 21. The adaptor tube 19 also has internal threads at its opposite end in which a connector cap 22 is screw threaded to position through the sleeve 23 the nozzle assembly. The sleeve 23 may be of plastic or similar material and is bonded to the air conduit 16. The sleeve 23 is located axially from the nozzle 18 so that the nozzle 18 may be positioned adjacent the abutment or radial shoulder 24 of the adaptor tube 19. The nozzle 18 is provided with a forward portion 18a which is of smaller diameter than rearward portion 18b. The rearward portion 18b of nozzle 18 may have a shoulder 18c provided to abut shoulder 24 of adaptor tube 19. The nozzle 18 may be threaded to the conduit 16 or may be bonded to form an integral relationship. The oil conduit 17 has annularly placed radially extending abutments 25 that engage the inner wall of the nozzle to position the inner end of the oil conduit but to allow passage of air around the oil conduit. A chamber 26 is provided within the nozzle head whereby there may be some initial mixture of the oil and air and consequently some atomization prior to the emergence of the mixture from the nozzle. The nozzle has two slots 27 positioned at right angles, as shown in FIGURE 3, for directing the air and oil from the nozzle and to provide complete atomization as the oil and air mixture emerges from the nozzle. The slots 27 are such as to direct the preservative oil in a 180° arc thereby increasing the spread of the preservative within the engine cylinder.

*Operation*

In operation it has been found that an air pressure source of 60 p.s.i.g. and supplying 6 cubic feet per minute is adequate for most engine installations. It has also been found that an air pressure regulation of 40 p.s.i. in the regulator 4 and an air pressure regulation in the regulator 6 of 50 p.s.i. gives approximately an optimum air and preservative mixture; however, it should be realized that these pressures will vary depending on the length of the pressure conduits for both the oil and air and in accordance with the specific construction of the preservative nozzle. The oil that has been found very satisfactory for this type of preservation method is Grade 2, specification MIL-L-21260. However, it should be realized that other preservative oils may be adapted to the described apparatus and to the method of preservation herein disclosed. The regulators for each of the conduits 16 and 17 should be adjusted to give the best atomization and to equalize the atomization between each pair of conduits.

It has been found that in normal engine preservation it is wise to preserve the fuel system as well as the parts adjacent to and in contiguous relationship with the engine cylinder, and consequently if such fuel system preservation is desired, it should be accomplished prior to the preservation process herein disclosed. Generally, the fuel system preservation methods require running the engine either by an external force or by actual internal combustion. If the engine is of the dual ignition type the adaptor tube of this invention may be installed in one of the spark plug apertures and the second spark plug may be used for running the engine during the fuel system preservation. In such engines the adaptor tube may be permanently installed as long as the engine is to remain in substantially the preserved state, and reinstallation of the adaptor tube upon periodic re-preservation of the engine is avoided. With the nozzle assembly removed, the adaptor tube is closed by a cap similar to the cap 22 shown in the drawing but without any central apertures. In order that high cylinder pressures will not cause breakage of any of the components of the apparatus of the present invention when rotating the engine with the nozzle assembly installed, the pressure of the nozzle 18 on the shoulder 24 is such as to allow bypass of excessive pressure around the nozzle 18, and this pressure will be further bled to the atmosphere via aperture 28.

After the fuel system has been preserved it is desirable to allow the engine to cool so that the cylinder head temperature is below 125° F. prior to adding preservative to the engine by the method of this invention. The engine is then cranked slowly while the preservative is atomized within the engine cylinder or the engine may be held stationary for approximately 15 seconds of atomization until three-fourths of an ounce of preservative has been applied to each cylinder, and then rotated two revolutions by the starter or other external power while continuing the atomization. By either of these methods the atomized preservative will flow throughout the cylinder and will properly coat intake and exhaust valves and stems and the intake and exhaust manifolds associated therewith. The atomization operation may be effectively turned on and off as desired by the solenoid operated valves 10 and 13 and the amount of atomization can be controlled in accordance with each installation since different engines will undoubtedly require a different time period of atomization and a change in the number of revolutions of the engine during or between periods of automization. It should be realized that all of the cylinders of the engine are attached to the preservative apparatus and are preserved simultaneously thereby saving considerable time and providing equalization of preservative throughout all of the engine cylinders and related parts. Although only six pairs of air and oil conduits are shown, it is obvious that an increase or decrease in this number may be provided in accordance with the number of cylinders of the engine or engines to be simultaneously preserved.

An electric oil heater 31 may be provided in order to stabilize the temperature and, therefore, the viscosity of the preservative oil at the optimum for the apparatus. A thermostat 32 controls the heater for regulating the temperature of the oil at the desired setting in the conventional manner. A manual switch 33, a bulb 34 for indicating energization of the heater 31, and a battery 35 complete the circuit.

It should be recognized that the above description and drawings refer to only one particular embodiment of this invention and other forms may be made without departing from the scope of this invention in regard to either the apparatus or to the method enclosed herein.

We, therefore, do not intend to limit ourselves to the specific embodiment disclosed but only to the invention disclosed herein as given by the following claims.

We claim:

1. A preservation apparatus for an engine of the spark ignition type having an aperture for conventionally securing a spark plug thereto, comprising, an atomization nozzle adapted to be inserted in said aperture, said atomization nozzle including a central passage therein which terminates in a restricted discharge orifice, said discharge orifice having a smaller cross sectional area than the cross sectional area of said central passage, concentric conduit means fixed to said nozzle, said concentric conduit means comprising inner and outer conduits, said inner conduit extending into said central passage and having its discharge end positioned rearwardly of said discharge orifice so as to form a mixing chamber therebetween for creating a turbulent intermixing of air and preservative prior to introduction into said discharge orifice, means supplying air and preservative under pressure to said atomization nozzle through said conduit means, and valve means for regulating the flow of air and preservative.

2. A preservative apparatus for an internal combustion engine having a removable spark plug, comprising, an elongated tube adapted to have one end inserted in and secured to the spark plug aperture, said tube having an internal radial shoulder adjacent to but facing outwardly from said aperture, nozzle means having an orifice, said nozzle means abutting said radial shoulder and extending into the engine, concentric conduit means comprising inner and outer conduits extending through said tube to said nozzle for supplying air and preservative for atomization by the nozzle, said inner conduit of said concentric conduit means having its discharge end positioned rearward of the orifice in said nozzle so as to form a mixing chamber therebetween, said mixing chamber causing a turbulent intermixing of air and preservative prior to emergence from said nozzle orifice, a sleeve fixed to the outer one of said concentric conduits, cap means abutting the outer end of said sleeve and secured to the other end of said elongated tube, a preservative reservoir, air pressure supply means pressurizing said reservoir and the outer concentric conduit, conduit means connecting the pressurized preservative in the reservoir with the inner concentric conduit, controllable valve means connected to each of the concentric conduits, a preservative oil heater in the reservoir, and an automatic thermostatic means controlling said heater and maintaining a constant preservative temperature.

3. A preservation apparatus for an internal combustion engine having an aperture for conventionally securing a spark plug thereto, comprising, an elongated tube adapted to have one end inserted in and secured to the spark plug aperture, said tube having an inwardly projecting radial shoulder adjacent to but facing outwardly from said aperture, nozzle means abutting said radial shoulder and extending into the engine, said nozzle means having a forward portion of smaller diameter than its rearward portion, an atomization orifice in said forward portion of said nozzle, an air carrying conduit extending through said tube to said nozzle for supplying air for atomization, a preservative carrying conduit passing within said air conduit and concentric thereto for supplying preservative for atomization, said air conduit terminating within said rearward portion of said nozzle and being secured thereto, said inner preservative conduit terminating within said smaller diameter of said nozzle, a plurality of radially extending abutments engaging said preservative conduit and the inner wall of said smaller diameter of said nozzle so as to position said inner conduit in spaced relationship to said wall, said radially extending abutments allowing passage of air around said inner conduit, said inner conduit having its discharge end positioned rearward of said nozzle orifice so as to form a mixing chamber therebetween, said mixing chamber causing a turbulent intermixing of air and preservative prior to atomized emergence from said nozzle orifice, a sleeve fixed to said air carrying conduit, cap means abutting the outer end of said sleeve and secured to the other end of said elongated tube, said cap causing said air carrying conduit and said nozzle to firmly abut the radial shoulder on said elongated tube, a preservative reservoir, air pressure supply means pressurizing said reservoir and said air carrying concentric conduit, conduit means connecting the pressurized preservative reservoir with the inner preservative carrying concentric conduit, controllable valve means connected to each of said concentric conduits, a preservative oil heater in said reservoir, and an automatic thermostatic means controlling said heater and maintaining a constant preservative temperature.

References Cited by the Examiner

UNITED STATES PATENTS

| | | | |
|---|---|---|---|
| 825,290 | 7/06 | Barker | 158—78 |
| 1,170,699 | 2/16 | Stoffel | 117—104 |
| 1,398,775 | 11/21 | Gerleman | 117—18 |
| 1,989,696 | 2/35 | Kelley | 239—424 |
| 2,101,922 | 12/37 | Stoesling | 117—104 |
| 2,387,362 | 10/45 | Stewart | 118—317 |
| 2,587,060 | 2/52 | Meyer | 222—42 |
| 2,636,834 | 4/53 | Myers | 117—104 X |
| 2,642,034 | 6/53 | Griffin | 118—317 |
| 2,691,428 | 10/54 | Thomas | 184—56 X |
| 2,730,463 | 1/56 | Phillips | 117—96 |
| 2,734,832 | 2/56 | Lewis | 117—96 |
| 2,808,294 | 10/57 | Tamminga | 239—424 X |

FOREIGN PATENTS

| | | |
|---|---|---|
| 554,335 | 3/58 | Canada. |

RICHARD D. NEVIUS, *Primary Examiner.*

WILLIAM D. MARTIN, JOSEPH B. SPENCER, *Examiners.*